United States Patent [19]

Chen et al.

[11] 4,202,932
[45] May 13, 1980

[54] MAGNETIC RECORDING MEDIUM

[75] Inventors: Tu Chen, Saratoga; George B. Charlan, San Jose, both of Calif.

[73] Assignee: Xerox Corporation, Stamford, Conn.

[21] Appl. No.: 952,023

[22] Filed: Oct. 16, 1978

Related U.S. Application Data

[62] Division of Ser. No. 927,068, Jul. 21, 1978.

[51] Int. Cl.² .................... G11B 7/24; H01F 1/06; B32B 15/04
[52] U.S. Cl. ................... 428/667; 75/134 V; 75/170; 252/62.55; 274/41 A; 360/131; 427/128; 427/132; 428/457; 428/900; 428/928
[58] Field of Search ............. 428/457, 900, 667, 928; 252/62.55; 274/41 A; 360/131; 427/128, 132; 75/134 V, 170; 148/31.55

[56] References Cited

U.S. PATENT DOCUMENTS

| | | | |
|---|---|---|---|
| 2,989,480 | 6/1961 | Matthias | 427/128 X |
| 3,421,889 | 1/1969 | Ostertag et al. | 75/170 |
| 3,480,429 | 11/1969 | Thiede et al. | 75/134 V |
| 3,652,343 | 3/1972 | Becker | 428/928 X |
| 3,664,892 | 5/1972 | Becker | 75/170 X |
| 3,787,237 | 1/1974 | Grunberg et al. | 428/928 X |
| 3,840,400 | 10/1974 | Yamada et al. | 428/900 X |
| 3,928,870 | 12/1975 | Ahrenkiel et al. | 360/131 X |
| 3,929,604 | 12/1975 | Shirahata et al. | 427/132 |
| 4,002,546 | 1/1977 | Shirahata et al. | 428/457 X |

Primary Examiner—Harold Ansher

[57] ABSTRACT

A magnetic recording medium comprising a thin film of magnetic material disposed upon a non-magnetic substrate wherein the magnetic material is an alloy of cobalt with a second constituent which may be rhenium, ruthenium or osmium. The magnetic material will have a coercive force of up to 800 Oe and a squareness ratio of up to 98%.

6 Claims, 7 Drawing Figures

MAGNETIC RECORDING MEDIUM

This application is a division of our application Ser. No. 927,068 filed on July 21, 1978.

BACKGROUND OF THE INVENTION

This invention relates to a method of making an excellent magnetic recording medium by vacuum deposition of a selected range of composition of Co base alloy systems which includes rhenium (Re), ruthenium (Ru) or osmium (Os) or an admixture of two or three of such elements under a given deposition rate, vacuum environment and substrate temperature to provide a recording medium with high density recording.

DESCRIPTION OF PRIOR ART

In the magnetic recording, the conventional recording mediums are generally comprised of $\gamma-Fe_2O_3$, Co-doped $\gamma-Fe_2O_3$, $Fe_3O_4$ or $CrO_2$ powdery ferromagnetic alloys dsipersed into an organic binder to form a coating-layer on a suitable substrate. In this type of recording medium, because of the relative low magnetization of the powdery ferromagnetic alloys and the existence of a non-magnetic organic binder, the recording medium layer should have a thickness on the order of a micrometer.

In the technology of magnetic recording, the improvements which are sought are primarily concerned with the increase in the recording bit density per given area. For open-flux memory elements employed in disk, drum or tape recording systems, the limit of the recording density will be determined by the ratio of the demagnetizing field to the coercive field of the film. Also the strength of the demagnetizing field is related to the saturation magnetization and the thickness of the medium. Furthermore, in order to attain an acceptable standard of maximum resolution and signal to noise ratio in the data extraction, it is necessary to obtain the smallest possible thickness of recording medium layer which is capable of providing a sufficient output signal. This compromise can be achieved with greater ease as the saturation induction and the squareness of the hysteresis B-H loop of the medium are made higher. In terms of all these constraints, it is the main objective to obtain a magnetic thin film medium having a high coercive field, a high squareness of hysteresis loop and of small layer thickness, preferable less than 1000Å thick, but possessing a high remanent magnetic moment.

The ferromagnetic metal thin films produced by electrochemical depositions, such as electroplating and electroless plating, and by vacuum deposition, such as ion plating, diode sputtering, ion beam sputtering, electron beam evaporation and thermal evaporation, have attracted special interest as to non-binder type magnetic recording media, i.e., media that does not use a binder. This type of non-binder metallic magnetic thin film, in general, has a much higher saturation magnetic induction than the oxide media, previously referred to, and, therefore, fabricated ten times thinner in layer thickness as compared to binder type recording media and still provide a sufficient remanence for the output signal.

Although there is much progress in making the metallic type thin film based on electroplating or electroless plating of the ferromagnetic films such as Co—P and Ni—Co—P, the film properties such as coercivity, $H_c$, or squareness of the hysteresis loop are strongly dependent on the structure of the disk substrate and the surface condition of the disk substrate. Therefore, it is rather difficult to obtain a magnetic disk with uniform and desired properties without elaborate preparation and careful handling of the substrate.

To overcome the disadvantage of the electroplating or electroless plating of the metallic magnetic thin film, the vacuum deposition process has been proposed. This process is performed under clean environments, and the deposited films are not strongly dependent on the surface and structure of the substrate. Examples of these proposals include alternate layers of Co—Cr multilayer structure by evaporation under a vacuum as disclosed in U.S. Pat. No. 3,787,237 and ion-plating of Co—Si, Co—Fe—Ni and Co—Si—Ni alloy thin film in a vacuum as disclosed in U.S. Pat. No. 4,002,546. The results shown and described in these patents are not optimum for the high density recording or are too complicated and not practical for commercial manufacturing processing. For example, in the multilayer Co—Cr structure film disclosed in U.S. Pat. No. 3,787,237, even though the value of coercivity, $H_c$, of the film can be made as high as 250 Oe or more, the value of $H_c$ is strongly thickness dependent, that is, it changes from approximately 200 Oe to approximately 600 Oe below layer thicknesses of 1000Å.

As mentioned earlier, the advantage of employing metallic magnetic film as the recording media is the ability of using a small thickness of the file because of the high magnetic induction associated with the metallic film. In practice, for high density recording, the most desirable range of film thickness in the metallic film is less than 1000Å. Therefore, the strong thickness dependence of the value of $H_c$ in the multilayer Co—Cr film in this thickness range would drastically increase the difficulty of making the film having a uniform coercivity over a large area.

Another disadvantage associated with this miltilayer Co—Cr structure is the cost of producing the film in the manufacturing of large area disks due to the multiple sequences required for fabricating the multilayer structure.

For the ion plating of Co—Si, Co—Fe—Ni and Co—Si—Ni alloy thin films, as disclosed in U.S. Pat. No 4,002,546, even though it was disclosed that it was possible to obtain the magnetic films with a coercive field a high as 700 Oe for some of the Co—Si alloy, the ration of the remanence, $B_r$, to the saturation induction, $B_s$, and the film is generally less than 0.8. Also the rectangularity or squareness ratio of the hystersis loop defined based on the magnetic field spread between the transition of the opposite magnetization near the coercive field has not been specified. With the rather low $B_r/B_s$ ratio and absence of specification of the squareness ratio based on field spread of the ion plated film places a strong limitation on the ability of this type of film for adaptability to high density recording.

The squareness ratio defined, based on this field near the coercive field, is the indication of the ability of film to perform a high density recording. This squareness based on the field spread near the coercive force has been deigned as S* by M. L. Williams, R. L. Comstock, AIP Conference Proceedings Magnetism and Magnetic Material, No. 5, Pept. 1,738 (1971), and as SQ in U.S. Pat. No. 3,738,818.

OBJECTS AND SUMMARY OF THE INVENTION

The main objective of this invention is to provide a magnetic recording medium having high coercive field, high remanence and high loop squareness for high density recording.

Another object of this invention is the provision of novel alloy systems that meet this main objective. These alloy systems are cobalt-rhenium (Co—Re), cobalt-ruthenuim (Co—Ru) or cobalt-osmium (Co—Os) or admixtures thereof with cobalt.

The present invention, which is directed to overcome the above mentioned disadvantages is directed to the production of thin films which are magnetically isotropic and in which the squareness ration $B_r/B_s$ and S* are between 0.8 and 1 while the value of the saturation induction of said films can be attained above 5000 gauss and the value of their coercive field can attain between 200 to 800 Oe.

More particularly, the present invention relates to the formation of a thin film with a strong coercive field and high remanence for high density magnetic recording, which comprises a non-ferromagnetic support of substrate and, over laying of said support, a single layer of Co—Re, Co—Os, or Co—Ru alloy film deposited by a vacuum deposition method, including but not limited to the following processes: D.C. or R.F. diode sputtering, ion beam sputtering, thermal evaporation and electron beam evaporation.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Figure 1:
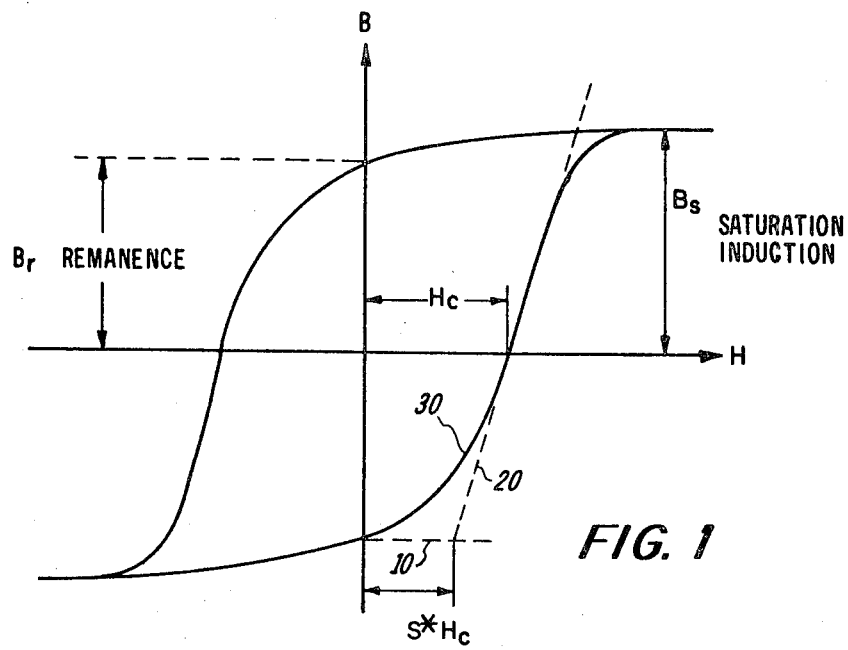
FIG. 1 shows a general hysteresis curve for magnetic recording media in support of the definition for residual induction, $B_r$, saturation induction $B_s$, coercive field, $H_c$, and squareness ratio ($B_r/B_s$ and S*).
Figure 2:
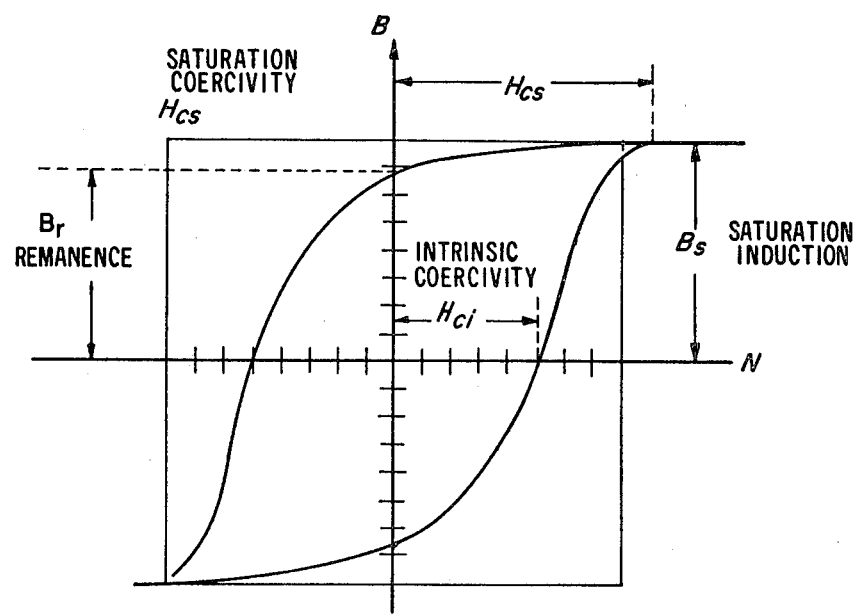
FIG. 2 squareness ratio SQ of a hystersis curve defined in U.S. Pat. No. 3,738,818.

FIGS. 1 and 2 demonstrate accepted methods of calculating squareness ratio based on field spread near the coercive field, $H_c$ or based upon the value of remanence, $B_r$ and the saturation induction, $B_s$. In FIG. 1, the Williams-Comstock method is shown. This is defined in terms of remanence or residual induction, $B_r$, and the slope of the major hysteresis curve at $H=H_c$ according to $S^* = H_c$ (dB/dH)−$B_r$ divided by $H_c$ (dB/dH). An ideal square loop would have S* equal to 1. Thus, S* is equal to H defined by line 10 divided by $H_c$, these values defined by the slope 20 of the major hysteresis curve 30 of the B—H loop and the value of $B_r$.

Another accepted means for determining the squareness ratio is the value of remanence, $B_r$, over the value of saturation induction, $B_s$.

In FIG. 2, the method of U.S. Pat. No. 3,738,818 to Eliot Stone and Pravin K. Patel is represented. The squareness ratio, SQ, of the hysteresis loop is the values of intrinsic coercivity, $H_{ci}$ over the value of saturation coercivity, $H_{cs}$.

In any case, the squareness ratio is an indication of how good the magnetic film is as a recording medium in terms of recording density and signal to noise ratio signal readout. The higher these ratio values, the higher the recording density and signal to noise ratio.

For a magnetic material such as cobalt (Co) or its alloy to have high coercive field for high density magnetic recording, it is essential that the crystal structure of a film produced from such material or its alloy should have the high magnetocrystalline anisotropic hexagonal close-packed (HCP) phase of Co. Also the microstructure of the film such as grain size and crystallographic orientation of the film should attain a specific range of value. In order to attain this specific range of microstructure in the vacuum deposition of the film it is necessary to control deposition rate and heating of the support or substrate to a range of temperature at which a sufficient rate of migration of the deposited atoms can take place. The heating of the support can be achieved directly by a heater or indirectly by bombardment of the depositing atoms. In the case of diode sputtering, heating is accomplished by bombardment of free electrons or ions.

It is well known that the pure Co metal would tend to transform from a HCP phase at lower temperature to a face-center cubic (FCC) phase at higher temperature. In bulk Co metal, the transformation temperature of HCP to FCC is about 400° C. In vacuum deposition of the thin film the equivalent temperature at the surface where the atoms deposit on the support is generally higher, such as, several hundred degrees centigrade higher than the support temperature. Therefore it is very difficult to obtain a strictly HCP phase in vacuum deposition of a pure Co thin film. The vacuum deposited pure Co metallic thin films generally have a mixture of FCC and HCP phases and the existance of FCC phase in the film causes the coercive field of the film to decrease below the limit at which the film can no longer be useful as the media for high density recording, which limit may, for example, be below 100 Oe.

Figure 3A:
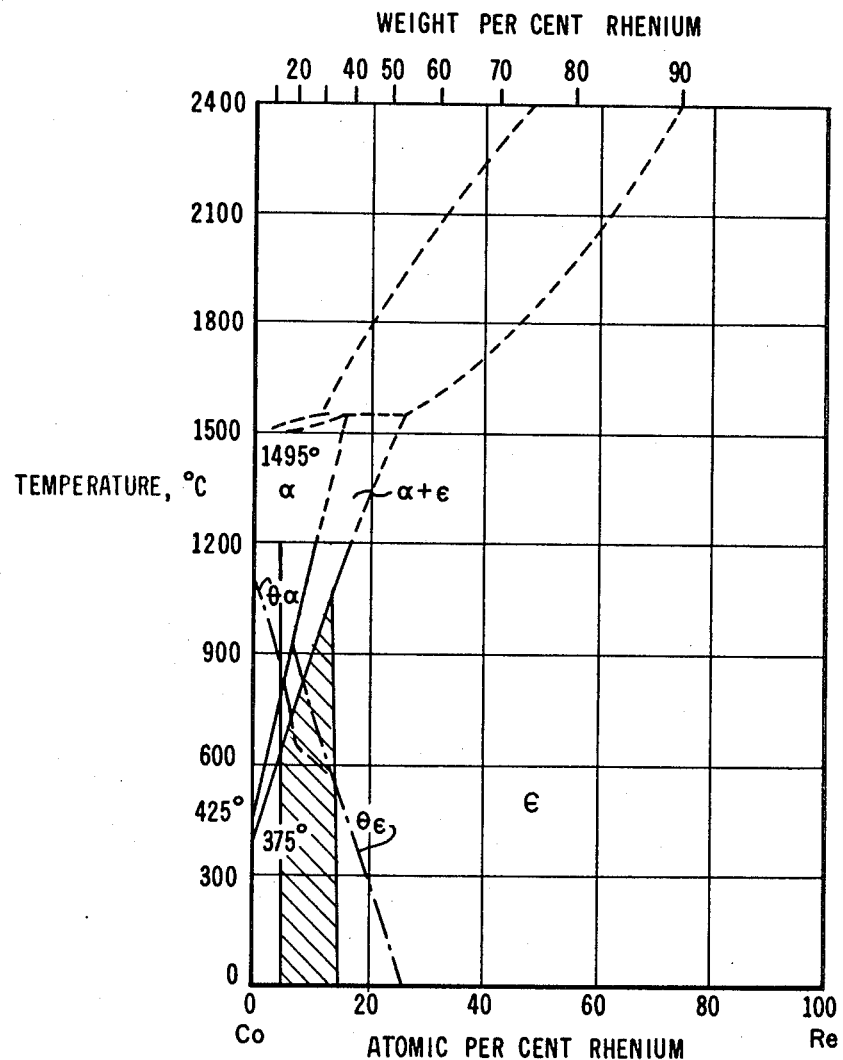
FIGS. 3A, 3B, and 3C show a binary phase diagram of Co—Re, Co—Ru, Co—Os and the preferred range of alloy composition to be used in the present invention.
Figure 3B:
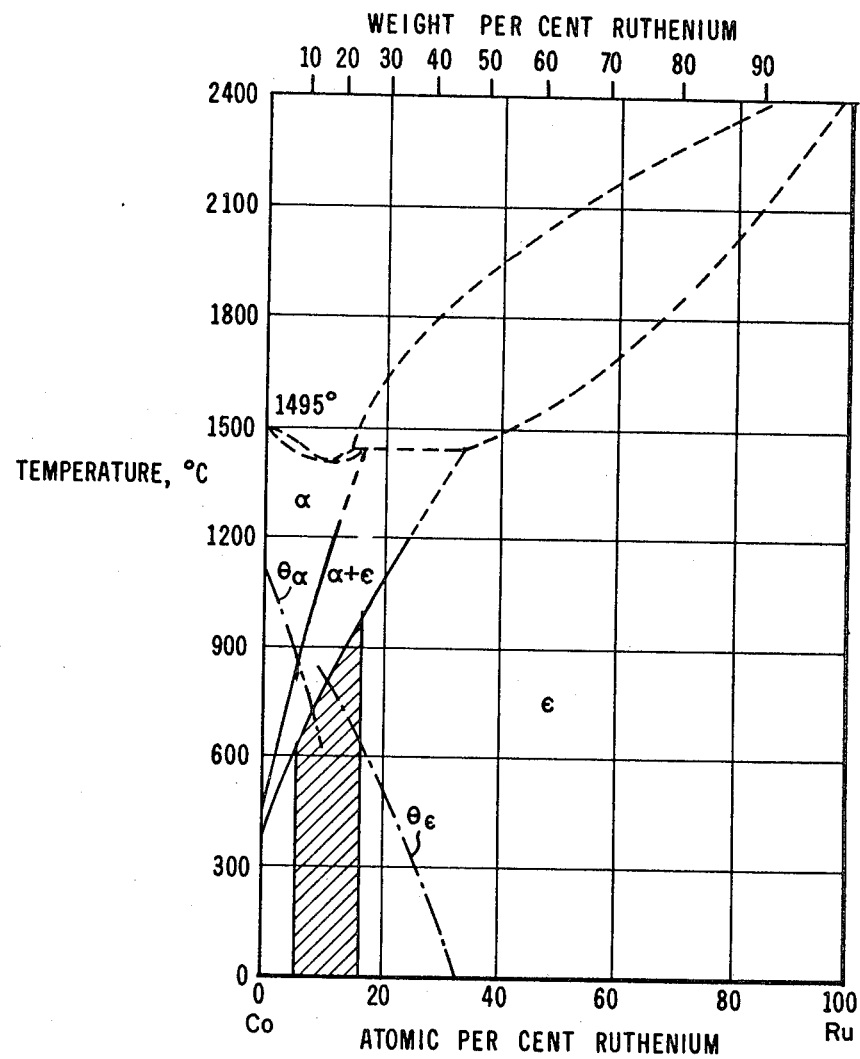
Figure 3C:
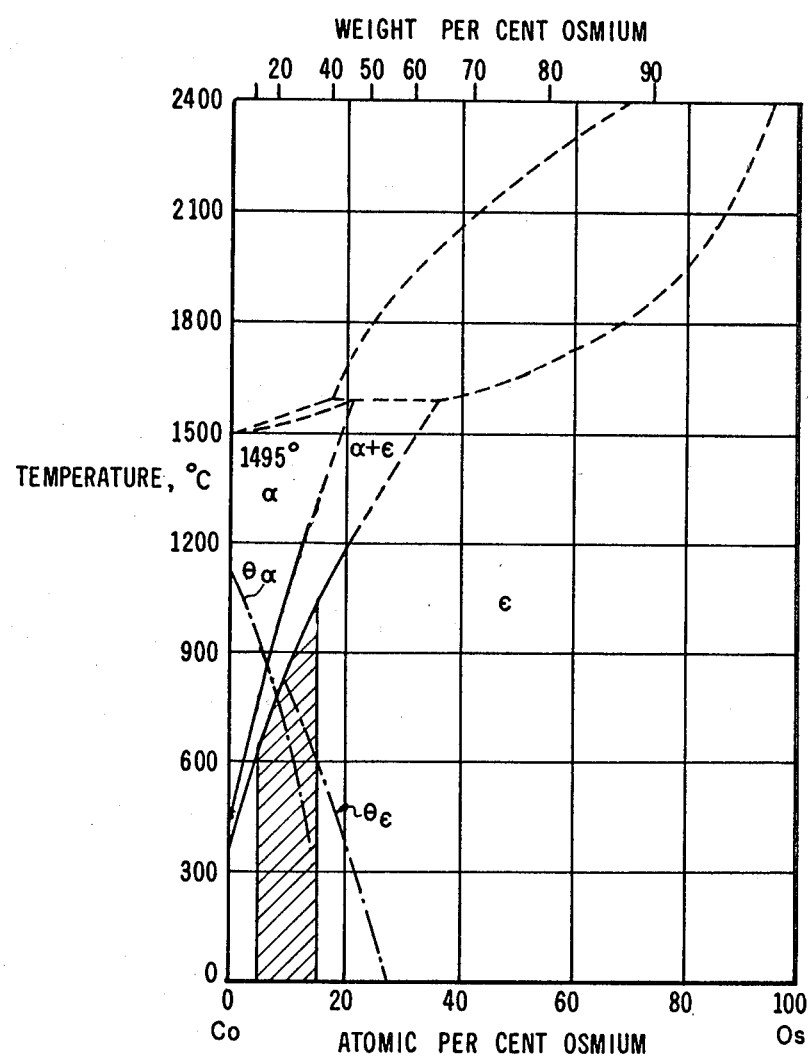

Disclosed here is the vacuum deposition of Co rich Co—Re, Co—Ru or Co—Os binary systems or Co rich admixtures consisting of Re, Ru and Os to obtain the high coercive field metallic film as the recording media for high density recording. As shown in FIG. 3, the three elements Re, Ru, Os form a unique and quite identical phase diagram with Co. The three elements form complete solid solubility with Co. The alloying of Co with one or more of the three elements stabilizes the HCP structure which is the $\epsilon$ phase in these Figures. The minimum concentration of the alloying element in cobalt is governed by the stabilization of the HCP phase and maximum concentration of the alloying element is governed by the Curie temperatures of the $\epsilon$ phase. Consequentially, the useful range of concentration will be approximately 2 to 25 atomic % of the alloying element or their admixtures. The preferred range of alloying element is represented by the shaded areas in FIGS. 3A, 3B and 3C in the $\epsilon$ phase. The preferred percentage is approximately 5 to 15 atomic percent of the elements, Re, Ru or Os or their admixtures. Consequently, alloying of Re, Ru or Os in a Co rich solid solution has increased the transformation temperature of HCP to FCC at about 400° C. for pure Co to more than 1000° C. for an alloy consisting of, for example, about 85 atomic % Co and 15 atomic % Re, Ru, or Os. The increase in stability of the HCP and the increase in the transformation temperature of the HCP to the FCC transition makes it easier to deposit a pure HCP phase Co-alloy thin film at a much wider range of support temperature. Consequently, it is possible to produce films with higher $H_c$ and hystersis squareness, that is, formation of a pure HCP phase film with desirable microstructure and crystalline orientation, through manipulation of support temperature over a wider range of temperatures.

In order to fabricate a magnetic recording medium, according to this invention, a nonmagnetic support of, e.g., metal, plastic or glass, and an evaporation source or sputtering target containing a given composition of the Co rich magnetic alloy are placed in a vacuum chamber. The magnetic alloy is then evaporated onto the support via thermal evaporation using an electron beam heating, or by sputtering using a diode or ion beam sputtering. Depending on the rate of deposition and the particular method of deposition and the range of coercive field and squareness desired for the final magnetic thin film, the support should be heated to a temperature in a range between ambient to 400° C., and preferably between ambient to 250° C. This temperature is maintained during the entire deposition process to facilitate the growth of the microcrystalline in the film.

In fabricating the thin film employing diode sputtering in either the R.F. or D.C. mode, an inert gas, such as Ar, Kr or Xe, should be maintained at a pressure between $3 \times 10^{-3}$ to $10^{-1}$ torr and the deposition rate should be maintained at a value between 0.1 to 5 Å/sec, preferably between 0.4 to 3 Å/sec. Variation of the deposition rate can be achieved by changing the applied power density, the support temperature, the gas pressure and by changing the target to the support distance. In the ion beam sputtering or electron beam evaporation, the vacuum pressure in the chamber is different, ranging from between $10^{-4}$ to $10^{-8}$ torr depending on the system and mode of operation. The deposition rate of the alloy films, however, should be maintained within the same range as in the case of diode sputtering specified above. The essence is to control the deposition rate and temperature of the support within the specified ranges to achieve the desired microstructure in a film which would give rise to an improved coercive field and squareness ratio of the B-H hysteresis loop. The desired microstructure is characterized by a HCP structure having a proper grain size and proper separation between the grains. Employing the particular alloy system of this invention in above sputtering method, control of grain separation and grain growth can be carefully regulated by controlling substrate temperature, deposition rate and inert gas pressure.

The resulting magnetic thin film so produced consists essentially of Co and the alloying element or elements of Re, Ru or Os, having a coercive field of up to 800 Oe and squareness ratio S* of up to 98%. The coercive field and the squareness have a small thickness dependence in the thickness range of 200 to 2000Å. It will be apparent that the magnetic properties of the resulting magnetic thin film and the ease of production are greatly improved as compared with the other vapor deposition methods for fabricating the multilayer structure and the ion plating method for fabricating Co—Si structure, previously mentioned.

The thickness of the magnetic thin film according to this invention must be sufficient to provide sufficient signal output as a high density magnetic recording medium. Therefore, the thicknesss of the magnetic thin film is generally between 200 to 5000 Å, preferably 200 to 2000 Å.

As for the support nonmagnetic metals such as, aluminum, copper, brass and stainless steel may be used and nonmagnetic inorganic materials, such as glasses and ceramics, or nonmagnetic plastic materials may be used.

The support may be shaped in the form of a tape, sheet, card, disk or drum and a fairly uniform thickness magnetic thin film can be produced when employing the vacuum deposition method.

According to the invention, magnetic recording media having good adhesion of the magnetic layer of the support and consisting of a magnetic thin film having excellent magnetic properties of high coercive field, high squareness ratio of B—H hysteresis loop and high saturation induction can be produced by conventional vacuum deposition techniques. The present invention will now be described by several detailed examples employing a R.F. sputtering technique, but this invention is not to be construed as limited thereto.

EXAMPLE 1

A glass plate of 0.5 mm thick was used as a support. The glass plate was placed on the substrate holder of a conventional sputtering system, and the temperature of the plate was monitored using a radiation heating element placed behind the opposite side of the surface of the support on which the alloy thin film was to be deposited. An alloy sputtering target consisting of either 92.5 atomic % Co and 7.5 at % Re in one case and 90 at. % Co and 10 atomic % Re in another case was placed on the cathode of the R.F. sputtering system. After the sputtering apparatus was evacuated to $10^{-6}$ torr or lower pressure, argon gas of $3 \times 10^{-3}$ to $10^{-1}$ torr was introduced into the chamber. The sputtering process proceeded with the sputtering rate adjusted primarily by input power density to the sputtering system and, secondarily, by argon pressure and the distance between the target and the support. The distance between the support and the target was maintained at about 4 cm in this example. The support was preheated to a given temperature before actual sputtering and the temperature was maintained during the entire sputtering period. The deposited films consisted essentially of the Co—Re alloy as determined by a microprobe process. The thickness of the film was determined by a talystep and compared with an optical interferrometer. The magnetic properties of the resulting magnetic thin film were determined based on the hysteresis loop measured using a vibrating sample magnetometer and the results, including the target composition, support temperature, rate and thickness, are shown as in Table I. Four sputtered examples contained 7.5 atomic % Re and seven other sputtered examples contained 10 atomic % Re.

Figure 4:
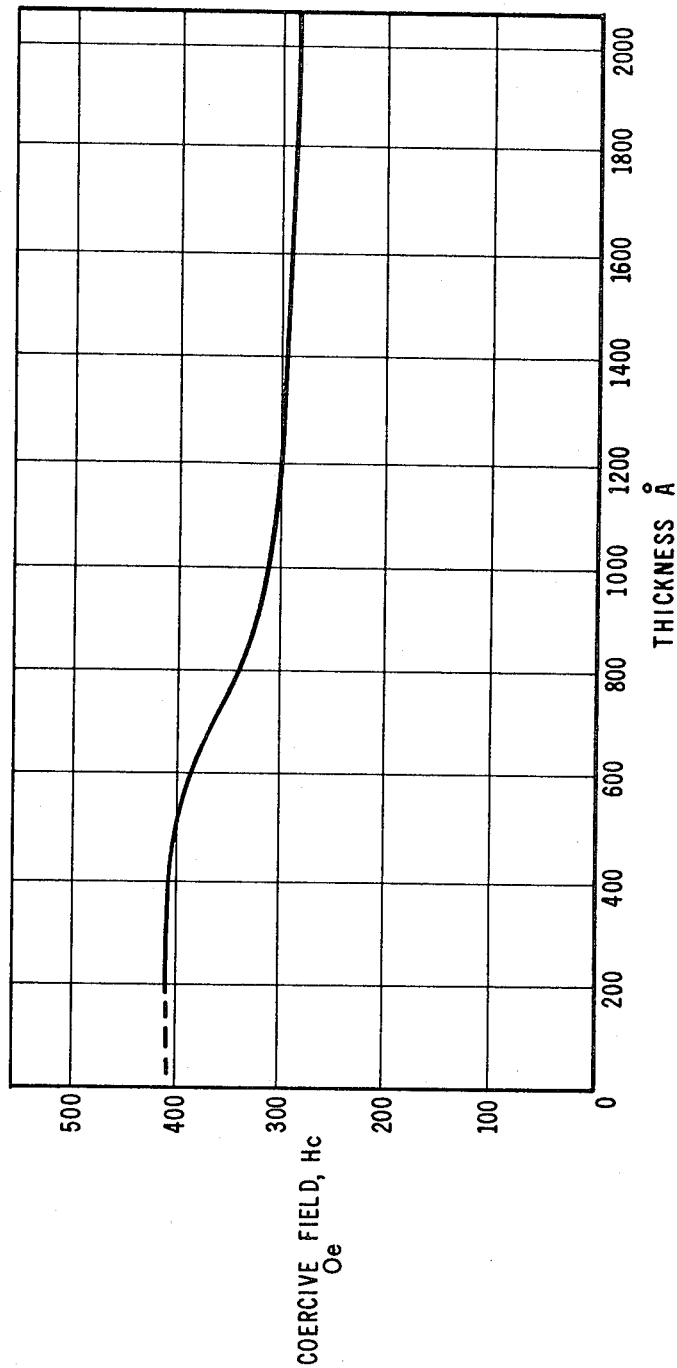
FIG. 4 is a diagram showing the influence of layer thickness of a Co—Re alloy thin film on the coercive field.
Figure 5:
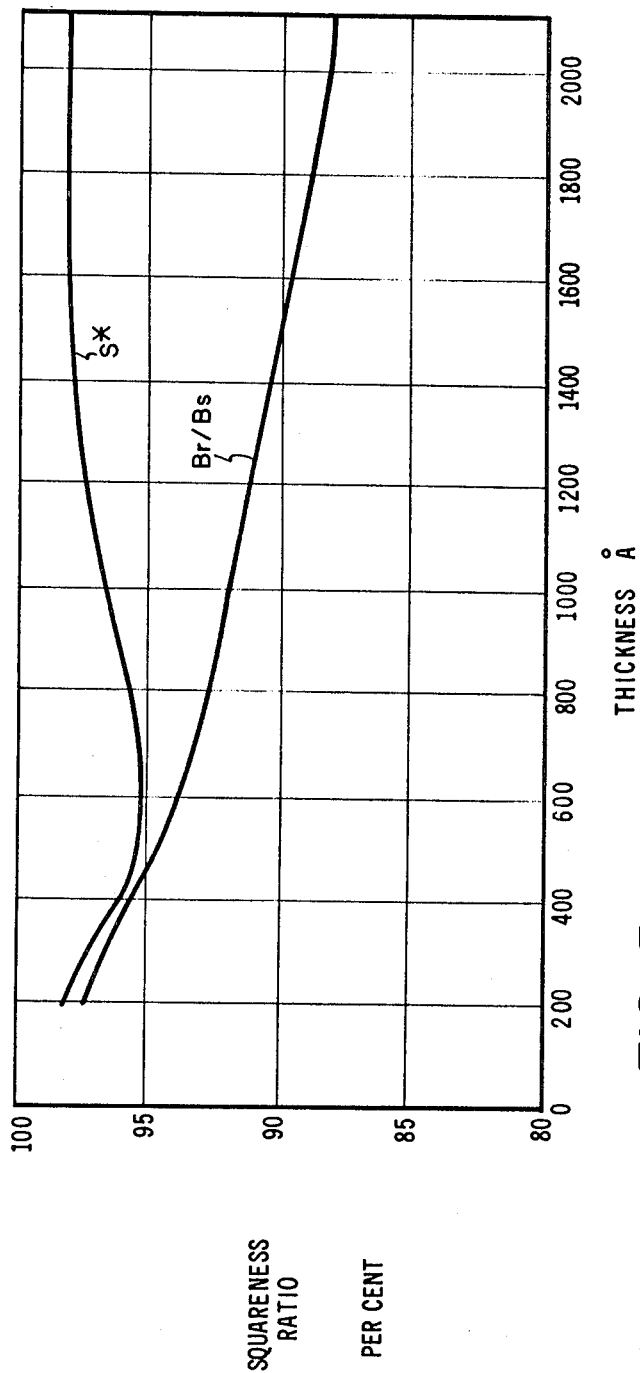
FIG. 5 is a diagram showing the influence of layer thickness on the squareness ratio, $B_r/B_s$ and S*, for the Co—Re alloy thin film of FIG. 4.

As shown in Table I, the magnetic thin film produced by sputtering of Co—Re on the surface of a glass support using the specified range of composition, support temperature and deposition rate had an excellent coercive field, squareness ratio and saturation induction which were suitable for use as high density magnetic recording media. Furthermore, the magnetic thin film so produced shows excellent isotropic magnetic properties in the plane of the film. It is apparent from the results shown in Table I, that the overall magnetic properties, such as, coercive field and squareness ratio, obtained in these Co—Re examples are much improved over previously known magnetic thin film materials. For best results, it is preferred that (1) the deposition rate be maintained between 0.4 Å/sec to 2 Å/sec, (2) the support temperature be maintained between ambient to 250° C., (3) the target material consist of between 5 to 15 atomic % Re balanced with Co and (4) films deposited by the D.C. or R.F. sputtering method, the sputtering inert gas pressure should be maintained between $3 \times 10^{-3}$ and $10^{-1}$ torr.

above were employed. The results of the measured magnetic properties on the produced magnetic thin film with thickness of 500 Å showed a coercive field of 400 Oe and squareness ratio $B_r/B_s$ of 0.92 and S* of 0.94. These properties are similar to the magnetic thin film deposited on the glass support as shown in FIGS. 4 and 5 and Table I under deposition conditions. Thus, the same excellent magnetic thin film properties are produced on both metal and glass supports indicating no support surface dependence.

While the invention has been described in conjunction with specific embodiments, it is evident that many alternatives, modifications an variations will be apparent to those skilled in the art in light of the foregoing description. Accordingly, it is intended to embrace all

TABLE I

| at. % Re in the target | Temperatue of the support ° C. | Deposition rate A/sec | Thickness of the magnetic film A | Coercive field in Oe | Squareness ratio in Br/Bs | Squareness ratio in S* | Approximate Saturation induction in gauss |
|---|---|---|---|---|---|---|---|
| 7.5 | 20 | 0.58 | 522 | 600 | .87 | .90 | 8500 |
| 7.5 | 20 | 0.68 | 615 | 729 | .80 | .81 | 8500 |
| 7.5 | 150 | 1.59 | 480 | 427 | .86 | .91 | 8500 |
| 7.5 | 200 | 0.51 | 615 | 280 | .93 | .85 | 8500 |
| 10 | 150 | 1.16 | 500 | 446 | .93 | .94 | 7000 |
| 10 | 150 | 1.57 | 475 | 359 | .94 | .98 | 7000 |
| 10 | 150 | 1.99 | 600 | 336 | .96 | .98 | 7000 |
| 10 | 200 | 1.15 | 555 | 413 | .93 | .94 | 7000 |
| 10 | 200 | 1.64 | 595 | 338 | .94 | .97 | 7000 |
| 10 | 300 | 1.39 | 505 | 210 | .97 | .99 | 7000 |
| 10 | 400 | 0.45 | 404 | 174 | .99 | .99 | 7000 |

EXAMPLE 2

Using a deposition condition of a support temperature and a deposition rate selected from the range given in Example 1, a series of magnetic thin films with different thicknesses were produced by the same sputtering method to show the influence of thickness on the coercive field and squareness of the magnetic thin film. To produce this series, a 10 atomic % Re-90 atomic % Co target was used, and the support temperature and the deposition rate were maintained at 200° C. and 1.1 Å/sec, respectively. The magnetic properties of the resulting magnetic thin films were measured and the results are shown in FIGS. 4 and 5, respectively, for the influence of the sputtered layer thickness on the coercive field and the squareness ratio. These results show that the influence of thickness on both the coercive field and the squareness ratio of the magnetic alloy thin film is very small in the thickness range of between 200 Å to 2000 Å. The small variations of the magnetic properties on thickness in the thin film produced by this invention provides a sufficient level of uniformity for coercive field and squareness ratio in a large area thin film media without having to maintain a close control of the uniformity of the layer thickness.

Also in this example, a metal type support was employed. This support consisted of an aluminum substrate overcoated with nonmagnetic nickel alloy. The same sputtering conditions and alloying target mentioned such alternatives, modifications, and variations as fall within the spirit and scope of the appended claims.

What is claimed is:

1. A magnetic recording medium of relatively magnetically isotropic thin metallic film on a support, said film comprising a metallic alloy of cobalt and either rhenium, ruthenium or osmium or an admixture thereof.

2. In a magnetic recording medium comprising a relatively magnetically isotropic thin film on a nonmagnetic support and providing a squareness ratio between 0.8 and 1 and a coercive field between 200 to 800 Oe relatively independent of film thickness, said film comprising a magnetic alloy of cobalt and an element selected from the group consisting of rhenium, ruthenium and osmium.

3. The magnetic recording medium of claim 2 wherein the selected element is from 2 to 25 atomic % of the alloy.

4. The magnetic recording medium of claim 3 wherein the selected element is from 5 to 15 atomic % of the alloy for best recording performance.

5. The magnetic recording medium of claim 2 wherein the second constituent is an admixture of two or more of said elements.

6. The magnetic recording medium of claim 5 wherein the selected admixture is from 2 to 25 atomic % of the alloy.

* * * * *

UNITED STATES PATENT AND TRADEMARK OFFICE
CERTIFICATE OF CORRECTION

PATENT NO. : 4,202,932
DATED : May 13, 1980
INVENTOR(S) : TU CHEN and GEORGE B. CHARLAN It is certified that error appears in the above-identified patent and that said Letters Patent are hereby corrected as shown below:

Column 1, line 48, change "preferable" to -- preferably --.

Column 2, line 50, change "ration" to -- ratio --
line 60, after the word "field" insert -- spread --.

Column 3, line 24, the word "of" should be changed to -- or --.

Signed and Sealed this

Ninth Day of September 1980

[SEAL]

Attest:

SIDNEY A. DIAMOND

*Attesting Officer*  *Commissioner of Patents and Trademarks*